C. LLOYD.
POWER TRANSMISSION.
APPLICATION FILED FEB. 7, 1921. RENEWED NOV. 30, 1921.

1,402,626.

Patented Jan. 3, 1922.
2 SHEETS—SHEET 1.

INVENTOR.
CHARLES LLOYD
BY
Mason Fenwick & Lawrence
ATTORNEYS.

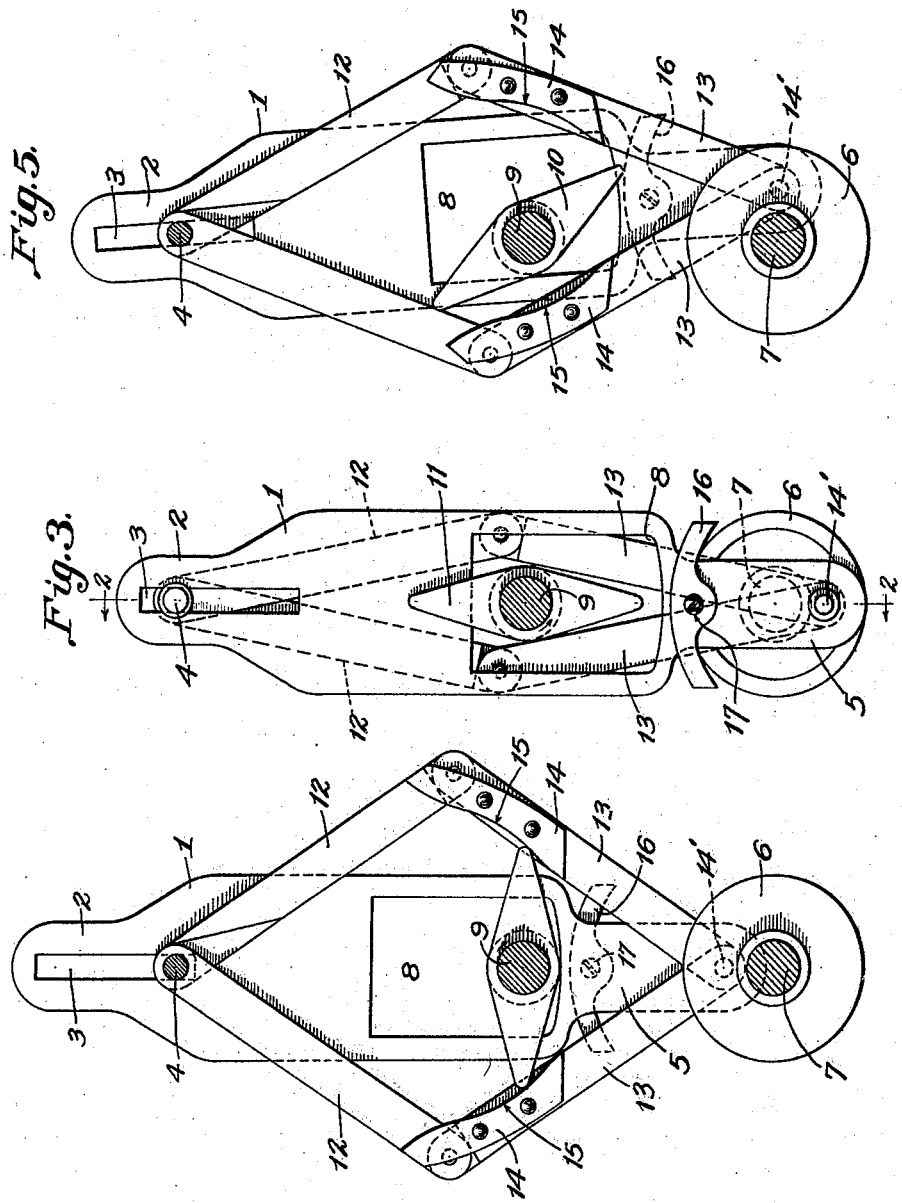

UNITED STATES PATENT OFFICE.

CHARLES LLOYD, OF BALTIMORE, MARYLAND.

POWER TRANSMISSION.

1,402,626.     Specification of Letters Patent.     Patented Jan. 3, 1922.

Application filed February 7, 1921, Serial No. 443,368. Renewed November 30, 1921. Serial No. 519,028.

*To all whom it may concern:*

Be it known that I, CHARLES LLOYD, a citizen of the United States, residing at Baltimore, and State of Maryland, have invented certain new and useful Improvements in Power Transmission; and I do hereby declare the following to be a full, clear, and exact description of the invention, such as will enable others skilled in the art to which it appertains to make and use the same.

This invention relates to new and useful improvements in power transmission and more particularly to a device for transmitting power from a driving shaft to a driven shaft and at the same time increase the speed of the driven shaft, the main object of the present invention is the provision of a device adapted to be applied to a driving shaft and having eccentric connection to a driven shaft whereby the driven shaft will be driven at a higher rate of speed than the driving shaft.

Another object of the present invention is the provision of the power transmitting device especially adapted for increasing speed when transmitting power from a driving shaft to a driven shaft and wherein the construction of the device will enable the operator to readily attach the same to the driving shaft or remove it therefrom.

With the above and other objects in view the invention consists in the novel features of construction, combination and arrangement of parts hereinafter more fully set forth, pointed out in the claims and shown in the accompanying drawings in which:

Figure 3 is a front elevation, illustrating the same in a neutral position;

Figure 4 is a rear elevation illustrating the driving shaft in one-quarter position and the driven shaft in one-half position, and Figure 5 is a similar view illustrating the driving shaft in a three-eighth position and the driven shaft in a three-quarter position, showing the various changes of the link connection with respect to the position of the cams.

Figure 1:
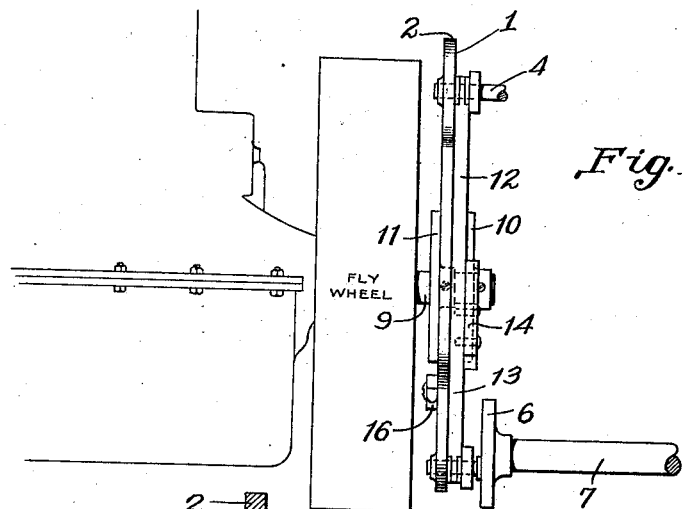
Figure 1 is a side elevation of a device constructed in accordance with my invention illustrating the same applied to the driving shaft of a motor.
Figure 2:
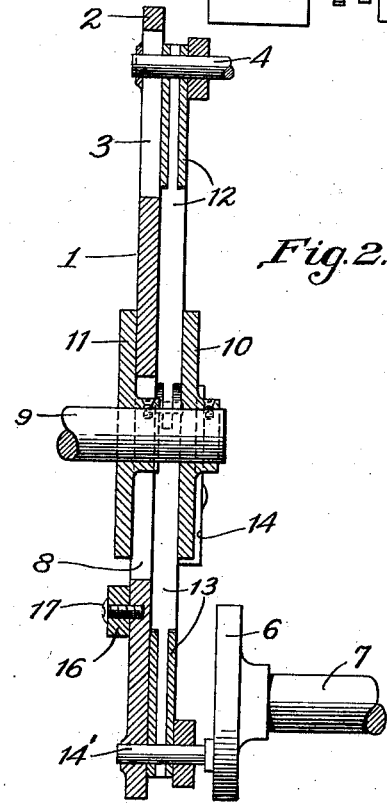
Figure 2 is a longitudinal sectional view.

In carrying out my invention I provide a main drive arm generally indicated by the numeral 1, one end of which is reduced as at 2 and provided with a longitudinal slot 3 adapted to receive a guide pin or bolt 4 which is suitably secured to any stationary support to retain the arm 1 in its respective operative positions. The other end of the arm is provided with a reduced portion 5 adapted to be eccentrically connected to a pulley 6 mounted upon the driven shaft 7.

The arm 1 is provided adjacent the reduced portion 5 with a suitable opening 8 through which extends the driving shaft 9 and mounted upon the driving shaft 9 in spaced relation are the diamond shaped cams 10 and 11.

In order to impart motion to the arm 1 I provide a pair of link members 12, each having one of their ends pivotally connected to the stationary pin 4 and their other ends pivotally connected to a second pair of link members 13, the said second pair of link members having their opposite ends pivotally mounted upon the pin 14' which connects the reduced portion 5 of the arm 1 to the pulley 6. In order to impart movement of the link members 12 and 13, I attach the cam blocks 14 to the outer face of the link members 13, said cam blocks being provided with arcuate faces as shown at 15 adapted to be engaged by the ends of the cam members 10 upon rotation of the shaft 9, this engagement of the cams 10 with the cam faces 15 forcing the link members 12 and 13 outwardly to the position as illustrated in Fig. 4, thus bringing the pivot pin 14' to its uppermost position with respect to the driven shaft 7 as shown in Fig. 4, and upon continued rotation of the shaft 9, one end of the cam member 11 will engage the upper arcuate face of a cam block 16 attached to the reduced portion 5 of the arm 1 and arranged directly above the pivot pin 14' as clearly shown in Figure 3. This cam block 16 is securely attached to the side of the arm 1 by means of a screw bolt 17 although any other fastening means may be employed.

From the above description taken in connection with the accompanying drawings, it will be readily apparent that upon rotation of the driving shaft 9, the cam members 10 and 11 which are shown in a neutral position in Figure 3, will begin their rotation with the shaft 9, the cam 10 will engage the cam faces 15 on the cam blocks 14 and move the arms 12 and 13 outwardly to the position as illustrated in Fig. 4, thus bringing the pivot pin 14' from its lowermost position on the pulley 6 to its uppermost position as shown in Fig. 4, thus the pulley 6 completes one-half revolution upon one-quarter revolution upon the shaft 9. Upon continued rotation of the shaft 9, one end of the cam 11 will engage the upper arcuate face of the cam block 16 to force the arm 1 downwardly again to complete the revolution of the shaft 6 whereby the cam members 10 and 11 will then be disposed in a neutral position or at the completion of one-half revolution of the shaft 9 and upon further movement the ends of the cams 10 will again engage the cam faces 15 to bring the point 14 up to one-half revolution as shown in Figure 4 and upon the continued rotation of the shaft 9 the end of the cam 10 opposite the end which has previously engaged the cam block 16 will contact with the cam block 16 to complete the revolution of the pulley 6 and the shaft 9; thus it will be noted that the pulley 6 makes two revolutions during one revolution of the shaft 9 and doubling the speed of the driven shaft 7 with respect to the driving shaft 9.

It will be noted in the accompanying drawings that I have illustrated my improved power transmitting device as attached to the driving shaft of a motor vehicle engine, but I wish it to be understood that the same can be readily attached to a stationary engine in order that the speed of the driven shaft can be increased over the speed of the driving shaft, thus should the work of the driven shaft require a speed of 200 revolutions a minute, the driving shaft can be operated at the rate of 100 revolutions a minute and the driven shaft still maintain its proper number of revolutions in accordance with the work required, thus providing for considerable saving in fuel for operating the engine.

I claim:

1. A power transmitting device including a driving shaft, a driven shaft, a movable arm eccentrically connected to the driven shaft at one end thereof, means for guiding the opposite end of said arm in its proper relative positions, a pivot point arranged in alignment with the two shafts and in spaced relation with the driving shaft, link members arranged in pairs upon opposite sides of the driving shaft having their inner ends pivotally connected, one pair of said links having their outer ends mounted upon the pivot pin and the other pair of said links having their outer ends pivotally connected to the eccentric connection of the arm, cam faces carried by the link members, a cam face carried by the arm and cam members carried by the driving shaft for engagement with said cam faces whereby upon rotation of the driving shaft said cams will engage the cam faces and rotate the driven shaft at a higher rate of speed than the driving shaft.

2. A power transmitting device including a driving shaft and a driven shaft, a pivot pin arranged in spaced relation with the driving shaft and in alignment with both of said shafts, link members pivotally connected to the pin and having an eccentric connection to the driven shaft, an arm slidable upon the pivot pin and having eccentric connection to the driven shaft, cam faces carried by the links and arm and cam members carried by the driving shaft for engagement with said cam faces whereby upon rotation of the driving shaft the cams will engage the cam faces and rotate the driven shaft at a higher rate of speed than the driving shaft.

3. A device of the class described including a driving shaft and a driven shaft, link members eccentrically connected to the driven shaft, an arm arranged adjacent the links and eccentrically connected to the driven shaft, cam faces carried by said links and arm and cams carried by the driving shaft for engagement with said cam faces whereby upon rotation of the driving shaft the cams will engage said faces and rotate the driven shaft at a higher rate of speed than the driving shaft.

4. A device of the class described including a driving shaft and a driven shaft, movable members eccentrically connected to the driven shaft, cam faces carried by said movable members and cams carried by the driving shaft for engagement with said cam faces whereby upon rotation will engage the cams with the cam faces and rotate the driven shaft at a higher rate of speed than the driving shaft.

In testimony whereof I affix my signature.

CHARLES LLOYD.